March 11, 1952  O. R. CARPENTER  2,588,700
WELDED JOINT
Filed July 26, 1945
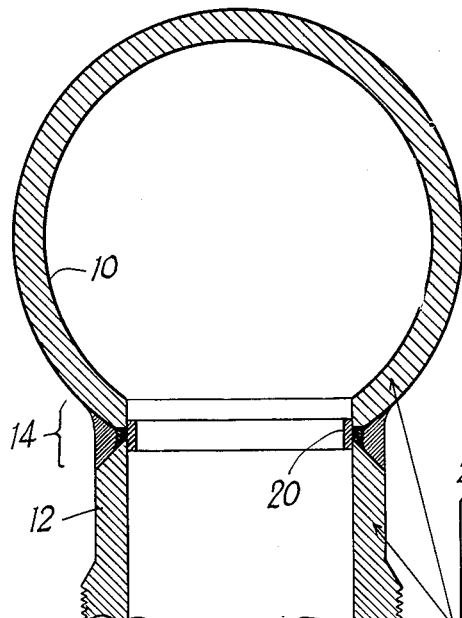
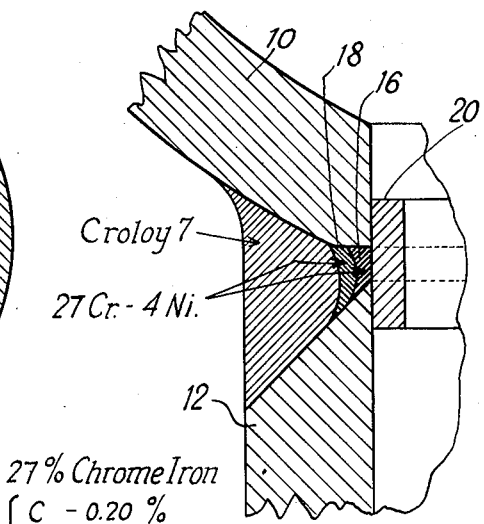
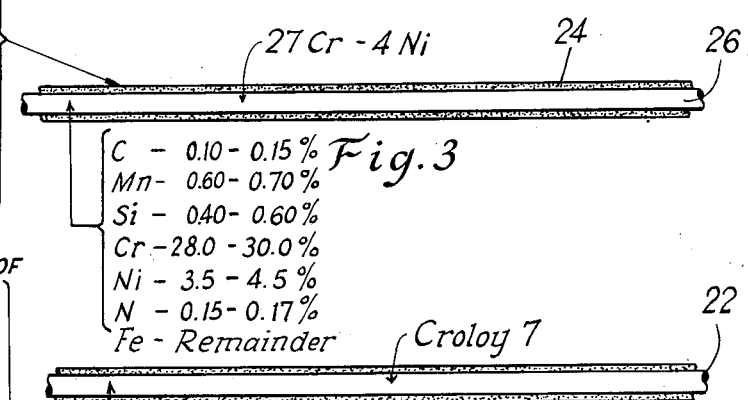
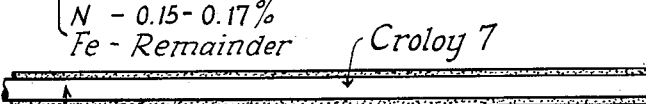
INVENTOR
Otis R. Carpenter
BY
R.W. Holbrook
ATTORNEY Patented Mar. 11, 1952

2,588,700

UNITED STATES PATENT OFFICE 2,588,700

WELDED JOINT

Otis R. Carpenter, Barberton, Ohio, assignor to The Babcock & Wilcox Company, Rockleigh, N. J., a corporation of New Jersey Application July 26, 1945, Serial No. 607,173

4 Claims. (Cl. 189—36)

This invention relates to welding and more particularly to improvements adapted for advantageous use in the welding of corrosion resistant steels of high chromium content.

The invention is further concerned with such welding developments which have proven successful in the manufacture of pressure vessel appurtenances and other equipment adapted for use in systems involving corrosive fluids at temperatures in the steel embrittlement range (600 F. to 1000 F.).

An object of the invention is to present welding improvements involving welds constructed in a novel manner and capable of long continued use in pressure vessel equipment subjected to service temperatures within the above range.

A more specific object of the invention is to present a duplex metal weld of such characteristics that even the maximum embrittlement involved in the pertinent equipment in service will not reduce the toughness or ductility of the weld to a hazardous degree.

A further object of the invention is to provide flux coated weldrods which are particularly adapted for the arc welding of alloy steels of high corrosion resistance.

Another object of the invention is a welding flux mixture which is productive of improved results in welding of alloy steels which have extreme air hardening and crack sensitivity characteristics.

The invention will be described with reference to the accompanying drawings, and other objects of the invention will appear as the description proceeds.

In the drawings:

Fig. 1 is a sectional view through a header and tube combination, the parts of which are joined by the use of the invention;

Fig. 2 is a fragmentary section of the Fig. 1 structure on an enlarged scale;

Fig. 3 is a view illustrating the flux coated weldrod employed in the welding of corrosion resistant steels of high chromium content; and Fig. 4 is a view showing a flux coated weldrod employed in the welding of an alloy steel of lower chromium content, but less susceptible to embrittlement at service temperatures in the range of 600 F. to 1000 F.

Fig. 1 of the drawings illustrates a header 10 and a section of a tube 12 united by a circular weld 14. The tube and the header are of chrome iron of high chromium content and high corrosion resistance, and the combination is intended to be illustrative of welded components of various shapes and dimensions, but all are particularly adapted for advantageous use in pressure vessels of fluid heat exchange installations subject internally to corrosive fluids at service temperature ranges of 600 F. to 1000 F.

Tube 12 and header 10 are united by the root beads 16 and 18 deposited in a groove formed by these elements and the backing up ring 20, by electric arc welding employing a weldrod such as that indicated in Fig. 3. The composition of this weldrod is of an alloy steel involving a nickel content of the order of 4%, and a chromium content comparable to that of the tube and the header. Furthermore, the crack sensitivity of the high chromium content weld metal, and the extreme air hardening characteristic of the latter are alleviated by the lime-titanium flux coating 24 of the weldrod 22. This flux coating may have a lime content of the order of 25–50% and a titanium oxide content of the order of 0–30%, in an equivalent percentage analysis.

In such an analysis the other ingredients of the coating may involve the following elements or compounds in the indicated ranges of equivalent percentages:

|  | Percent |
| --- | --- |
| $SiO_2$ | 20–35 |
| $Fe_2O_3$ | 2– 8 |
| $Al_2O_3$ | 0– 6 |
| $MgO$ | 0– 5 |
| $F$ | 5–25 |
| $CO_2$ | 11–22 |
| $Mn_3O_4$ | 3–10 |
| $Na_2O$ | 2– 6 |

For the 27 chromium-4 nickel weldrod shown, coatings having the following equivalent percentages have been found to coact with the other elements of the welding to produce excellent results:

| Equivalent percentages of: | Percent |
| --- | --- |
| $SiO_2$ | 22.9 |
| $Fe_2O_3$ | 5.1 |
| $Al_2O_3$ | 1.1 |
| $Mn_3O_4$ | 4.4 |
| $CaO$ | 44.3 |
| $MgO$ | 2.2 |
| $F$ | 17.2 |
| $CO_2$ | 18.1 |
| $Na_2O$ | 4.0 |
| $Cr_2O_3$ | 0.3 |

After the beads 16 and 18 of the 27Cr-4 Ni are formed, the remainder of the weld 14 is formed by the use of the coated weldrod 22, of an alloy known as Croloy 7. This terminology springs from the fact that chromium content of the weld metal of the weldrod is of the order of 7%. It also has approximately ½ of 1% of molybdenum. This weldrod preferably has a lime-titania coating indicated in Fig. 4.

This coating has the following analysis:

| Equivalent percentages of: | Percent |
|---|---|
| $SiO_2$ | 22.9 |
| $Fe_2O_3$ | 3.7 |
| $TiO_2$ | 4.3 |
| $Al_2O_3$ | 0.5 |
| $Mn_3O_4$ | 3.4 |
| CaO | 39.0 |
| MgO | 2.0 |
| F | 14.4 |
| $CO_2$ | 15.9 |
| $Na_2O$ | 3.1 |

However, the range of the equivalent percentages of the components of this coating is similar to the range of percentages given with respect to the coating employed on the weldrod 26 shown in Fig. 3.

The weldrod indicated in Fig. 4 of the drawings is of the following analysis:

| | Percent |
|---|---|
| C | 0.08 |
| Mn | 0.46 |
| Si | 0.55 |
| Cr | 7.16 |
| S | 0.018 |
| P | 0.020 |
| Mo | 0.47 |
| Fe | Remainder |

However, the range of elements in this composition may vary as indicated below:

| | Percent |
|---|---|
| C | 0.10–Max. |
| Mn | 0.40 –0.60 |
| Si | 0.40 –0.60 |
| Cr | 6.00 –8.00 |
| Mo | 0.40 –0.60 |
| S | 0.025–Max. |
| P | 0.025–Max. |
| Fe | Remainder |

The 27 chrome-iron of the header 10 and the tube 12, and the 27 Cr-4 Ni weld metal of the beads 16 and 18, are subject to embrittlement when cooled slowly through, or held at temperatures of, about 600 F. to 1000 F. When such temperature ranges are encountered in service conditions, the consequent embrittlement of the high chrome metal would result in an unsafe weld, due to its lack of toughness. In the present invention, this difficulty is overcome by the formation of the main body of the weld by the electrofusion deposition of the Croloy 7 steel which gives the weld a high percentage of toughness, when the weld structure is properly heat treated. Heating the finished weld 14 to 1375 F., followed by water-quenching or other methods of rapid cooling, softens the weld hardened Croloy 7 (or 7 Cr-½ Mo) weld metal, and imparts to the weld embrittled root beads 16 and 18 (27 Cr-4 Ni) and to the heat affected 27 chromium-iron of the header 10 and the tube 12, a relatively high degree of toughness. In service involving temperature ranges from 600 F. to 1000 F., there will be embrittlement in only the 27 Cr-4 Ni weld metal and the 27 chromium-iron base metal, and the latter more than the former. The 7 Cr-½ Mo weld metal retains its original ductility. However, the weld, as a whole, retains, after considerable service, a toughness greater than that of the 27 chrome-iron of the base metal of the header and the tube remote from the weld.

It is to be noted that the above described heat treatment involves a quick cooling through the carbide forming temperature range of the 27 Cr-4 Ni root beads 16 and 18. With this treatment the formation of chromium carbide in the root beads is minimized or substantially eliminated because there is insufficient time for its formation to any substantial degree.

I claim:

1. An installation for use involving a corrosive fluid at steel embrittlement temperatures (600 F.–1000 F.) and comprising corrosion resistant steel components having substantially the following composition

| | Percent |
|---|---|
| C | 0.20 |
| Mn | 1.50 |
| S | 0.025 |
| P | 0.025 |
| Si | 0.75 |
| Ni | 1.0 |
| Cr | 26.0–30.0 |
| N | 0.12–0.25 | balance iron and the usual impurities; and duplex metal welds uniting said components and each comprising a root deposit of a steel which, on quick cooling from temperatures above 1250 F., will retain its maximum resistance to corrosion without excessive increase in hardness and without excessive reduction in ductility, said steel having a chromium content of the order of that of said components and a nickel content of the order of 4%; and a deposit overlying said root deposit and filling the remainder of the weld groove and of a steel which can be cooled quickly from 1375 F. or below without appreciable hardening but which will harden when cooled quickly from above 1375 F., and which has good ductility when quenched from 1375 F., said last-named steel having substantially the following composition

| C | 0.08% Max. |
|---|---|
| Mn | from 0.40 to 0.60% |
| Si | from 0.40 to 0.60% |
| Cr | from 6.00 to 8.00% |
| Mo | from 0.40 to 0.60% |
| S | 0.025% Max. |
| P | 0.025% Max. | balance iron and the usual impurities.

2. An installation for use involving a corrosive fluid at steel embrittlement temperatures (600 F.–1000 F.) and comprising corrosion resistant steel components having substantially the following composition

| | Percent |
|---|---|
| C | 0.20 |
| Mn | 1.50 |
| S | 0.025 |
| P | 0.025 |
| Si | 0.75 |
| Ni | 1.0 |
| Cr | 26.0–30.0 |
| N | 0.12–0.25 | balance iron and the usual impurities; and duplex metal welds uniting said components and each comprising a root deposit of a steel which, on quick cooling from temperatures above 1250 F., will retain its maximum resistance to corrosion without excessive increase in hardness and without excessive reduction in ductility, said steel having a chromium content of the order of that of said components and a nickel content of the order of 4%; and a deposit overlying said root deposit and filling the remainder of the weld groove and of a steel which can be cooled quickly from 1375 F. or below without appreciable hardening but which will harden when cooled quickly from above 1375 F., and which has good ductility when quenched from 1375 F., said last-named steel having substantially the following composition

|   | Percent |
|---|---|
| C | 0.08 |
| Mn | 0.46 |
| Si | 0.55 |
| Cr | 7.16 |
| Mo | 0.47 |
| S | 0.018 |
| P | 0.020 | balance iron and the usual impurities.

3. An installation for use involving a corrosive fluid at steel embrittlement temperatures (600 F.–1000 F.) and comprising corrosion resistant steel components having

|   | Percent |
|---|---|
| C | 0.20 |
| Mn | 1.50 |
| S | 0.025 |
| P | 0.025 |
| Si | 0.75 |
| Ni | 1.0 |
| Cr | 26.0–30.0 |
| N | 0.12–0.25 | balance iron and the usual impurities; and duplex metal welds uniting said components and each comprising a root deposit of a steel which, on quick cooling from temperatures above 1250 F., will retain its maximum resistance to corrosion without excessive increase in hardness and without excessive reduction in ductility, said steel having substantially the following composition

| C | from 0.10 to 0.15% |
|---|---|
| Mn | from 0.60 to 0.70% |
| Si | from 0.40 to 0.60% |
| Cr | from 28.0 to 30.0% |
| Ni | from 3.5 to 4.5% |
| N | from 0.15 to 0.17% | balance iron and the usual impurities; and a deposit overlying said root deposit and filling the remainder of the weld groove and of a steel which can be cooled quickly from 1375 F. or below without appreciable hardening but which will harden when cooled quickly from above 1375 F., and which has good ductility when quenched from 1375 F., said last-named steel having substantially the following composition

| C | 0.08% Max. |
|---|---|
| Mn | from 0.40 to 0.60% |
| Si | from 0.40 to 0.60% |
| Cr | from 6.00 to 8.00% |
| Mo | from 0.40 to 0.60% |
| S | 0.025% Max. |
| P | 0.025% Max. | balance iron and the usual impurities.

4. An installation for use involving a corrosive fluid at steel embrittlement temperatures (600 F.–1000 F.) and comprising corrosion resistant steel components having

|   | Percent |
|---|---|
| C | 0.20 |
| Mn | 1.50 |
| S | 0.025 |
| P | 0.025 |
| Si | 0.75 |
| Ni | 1.0 |
| Cr | 26.0–30.0 |
| N | 0.12–0.25 | balance iron and the usual impurities; and duplex metal welds uniting said components and each comprising a root deposit of a steel which, on quick cooling from temperatures above 1250 F., will retain its maximum resistance to corrosion without excessive increase in hardness and without excessive reduction in ductility, said steel having substantially the following composition

| C | from 0.10 to 0.15% |
|---|---|
| Mn | from 0.60 to 0.70% |
| Si | from 0.40 to 0.60% |
| Cr | from 28.0 to 30.0% |
| Ni | from 3.5 to 4.5% |
| N | from 0.15 to 0.17% | balance iron and the usual impurities; and a deposit overlying said root deposit and filling the remainder of the weld groove and of a steel which can be cooled quickly from 1375 F. or below without appreciable hardening but which will harden when cooled quickly from above 1375 F., and which has good ductility when quenched from 1375 F., said last-named steel having substantially the following composition

|   | Percent |
|---|---|
| C | 0.08 |
| Mn | 0.46 |
| Si | 0.55 |
| Cr | 7.16 |
| Mo | 0.47 |
| S | 0.018 |
| P | 0.020 | balance iron and the usual impurities.

OTIS R. CARPENTER.

REFERENCES CITED

The following references are of record in the file of this patent:

UNITED STATES PATENTS

| Number | Name | Date |
|---|---|---|
| 1,762,483 | Norwood | June 10, 1930 |
| 1,835,900 | Rode | Dec. 8, 1931 |
| 1,876,724 | Gregg | Sept. 13, 1932 |
| 1,896,411 | Maskrey | Feb. 7, 1933 |
| 1,934,065 | Hermanson | Nov. 1, 1933 |
| 2,016,585 | Basore | Oct. 8, 1935 |
| 2,060,765 | Welch | Nov. 10, 1936 |
| 2,118,693 | Arness | May 24, 1938 |
| 2,156,306 | Rapatz | May 2, 1939 |
| 2,158,799 | Larson | May 16, 1939 |
| 2,233,455 | Larson | Mar. 4, 1941 |
| 2,244,064 | Hodge | June 3, 1941 |
| 2,249,629 | Hopkins | July 15, 1941 |
| 2,294,650 | Bechtle | Sept. 1, 1942 |
| 2,306,421 | Arness | Dec. 29, 1942 |
| 2,405,666 | Norwood | Aug. 13, 1946 |